(12) United States Patent
Lingelem

(10) Patent No.: US 6,495,035 B2
(45) Date of Patent: Dec. 17, 2002

(54) DEVICE IN CONNECTION WITH A SEPARATOR

(75) Inventor: Morten Næss Lingelem, Sandefjord (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/781,315

(22) Filed: Feb. 13, 2001

(65) Prior Publication Data

US 2001/0025813 A1 Oct. 4, 2001

(30) Foreign Application Priority Data

Feb. 18, 2000 (NO) .............................................. 000008

(51) Int. Cl.7 ................................................ C02F 1/20
(52) U.S. Cl. ........................ 210/188; 210/519; 210/539
(58) Field of Search .................................. 210/519, 527, 210/532.1, 540, 512.1, 188, 539

(56) References Cited

U.S. PATENT DOCUMENTS

| | | | | |
|---|---|---|---|---|
| 973,424 A | * | 10/1910 | Greth | 210/207 |
| 1,458,805 A | * | 6/1923 | Christenesen | 210/521 |
| 2,447,286 A | * | 8/1948 | Smith et al. | 210/519 |
| 3,136,724 A | * | 6/1964 | Lind et al. | 210/519 |
| 3,797,203 A | * | 3/1974 | Murdock, Sr. | 210/521 |
| 3,933,642 A | * | 1/1976 | Wilson | 210/206 |
| 4,135,946 A | * | 1/1979 | Casey et al. | 210/519 |
| 4,376,676 A | | 3/1983 | Gill | |
| 4,752,392 A | * | 6/1988 | Dacquet | 210/519 |
| 5,120,436 A | * | 6/1992 | Reichner | 210/519 |
| 5,840,198 A | * | 11/1998 | Clarke | 210/540 |

FOREIGN PATENT DOCUMENTS

DE 35 29 760 2/1987

* cited by examiner

Primary Examiner—Christopher Upton
(74) Attorney, Agent, or Firm—Wenderoth, Lind & Ponack, L.L.P.

(57) ABSTRACT

A device in connection with a separator (3) in a processing plant, for example, a plant for processing a fluid consisting of oil, water, gas and possibly solid substances. The separator includes a container or a chamber (7) with an inlet (1) for the fluid to be separated and two or more outlets for each of the respective separated phases. The fluid is designed to flow via a spiral duct (2), which extends from the inlet (1) down towards the base of the container (7). The container (7) may expediently be mainly cylindrical and vertical and the duct (2) extends along the periphery of the container.

17 Claims, 3 Drawing Sheets

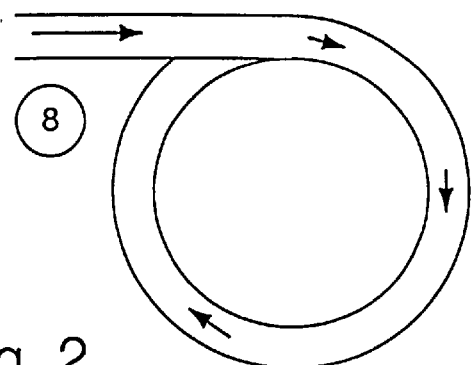
Fig. 2
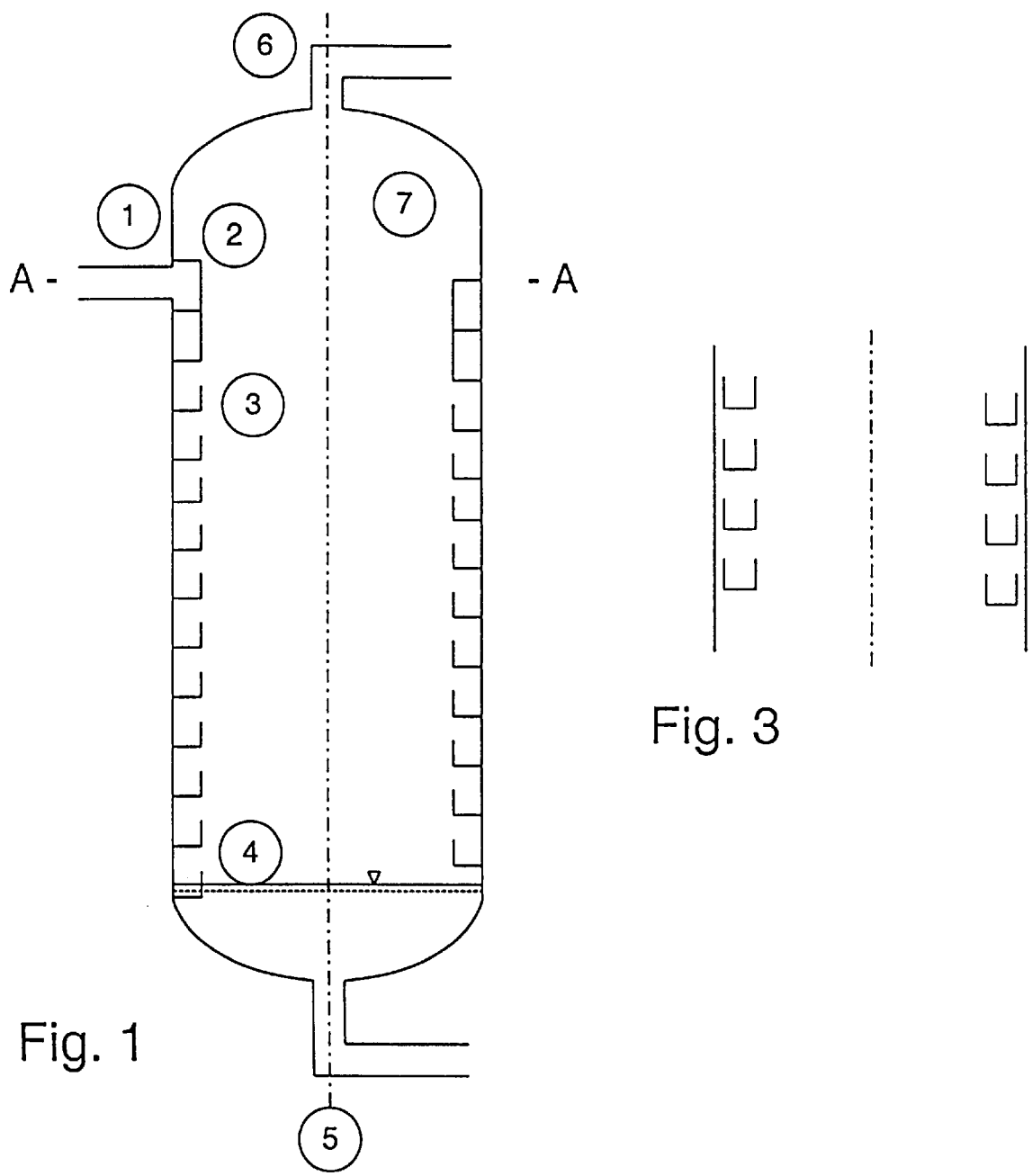
Fig. 1
Fig. 3

DEVICE IN CONNECTION WITH A SEPARATOR

BACKGROUND OF THE INVENTION

1. Field of the Invention

The present invention concerns a device in connection with a separator in a processing plant, for example a plant for processing a fluid consisting of oil, water and/or gas, comprising a container or separation tank for separation of the various phases of the fluid, an inlet arranged in connection with the tank and two or more outlets.

2. Description of Related Art

Separators designed to handle large variations in liquid quantity will often have a large distance between the inlet and the normal liquid level. The inlet often generates large drop quantities and the rate of fall of the liquid creates further drops when the liquid meets the surface of the liquid in the separator. In such separators it is often important to reduce the volume taken up by internals to a minimum so that the volume available to buffer (cushion) the liquid is at a maximum. It is therefore important to reduce the drop formation at the inlet, the rate of fall of the liquid towards the surface of the liquid and the volume of the internals in the separator.

French patent application no. 9007622 describes a procedure and device for the separation of a liquid, for example oil and water, in which the two phases are introduced into a vertical, cylindrical chamber and a helical part inside this chamber, of which at least one side consists of a helical surface. This solution works as follows. The coalition of the dispersed phase of oil and water takes place on the surface of the internal screw by the liquid to be separated being exposed to a rotational vovement as a consequence of it flowing downwards along the screw. The purpose of such a rotational movement is to utilize both gravitational force and centrifugal force to achieve effective separation. The light phase, the oil, will flow inwards towards the chamber's (screw's) axis and upwards, while the heavier phase, the water, will flow downwards towards the base of the chamber.

This prior art solution is expensive to produce and has low capacity. Moreover, the presence of any gas in the fluid to be separated seems to disturb the separation process and will thus reduce its efficiency.

The present invention concerns a device in connection with a separator in which it has been possible to reduce the drop formation at the inlet, the rate of fall of the liquid towards the surface of the liquid and the volume of the internals. The present invention is able to handle large flows, main flows of oil/water and any sub-flows.

The present invention is characterized in that the fluid to be separated is designed to flow via a spiral duct which extends from the inlet down towards the base of the container.

BRIEF DESCRIPTION OF THE DRAWINGS

The present invention will be described in further detail in the following using examples and with reference to the attached drawings, in which:

FIG. 1 shows a schematic diagram of a separator in accordance with the present invention;

FIG. 2 shows a horizontal section taken along line A—A in FIG. 1;

FIG. 3 shows an alternative embodiment of a separator in accordance with the present invention;

DETAILED DESCRIPTION OF THE INVENTION

Figure 4:
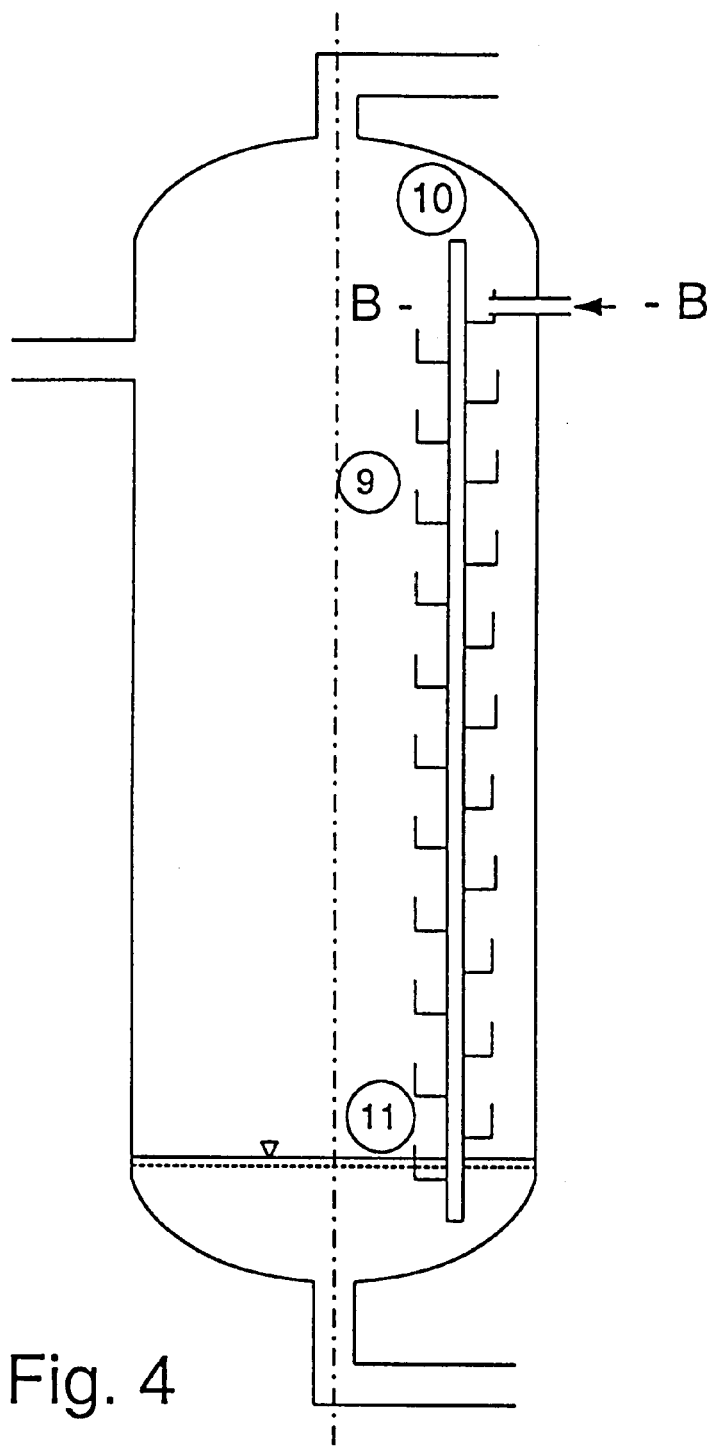
FIG. 4 shows another alternative embodiment of a separator in accordance with the present invention.

The present invention concerns a vertical type separator (gravitation separator). The separator has an inlet 1 where fluid in the form of liquid, gas and possibly other phases flows in. The flow is led mainly tangentially into a spiral channel or duct 2 which extends downwards along the side of the separator container 7 or inside it. The duct 2 may be closed at the top to prevent drops of liquid from flowing out prematurely and thereby taking shortcut to the gas outlet. The cross-section of the channel may, at its upper part, increase in the direction of flow so that the speed of liquid flow is gradually reduced.

The duct 2 should be open over a large part of the separator's length (height) so that gas can escape. The duct 2 must, of course, be optimized in each case with regard to cross-section, length and the length of the closed part in order to take account of gas speed, the movement of the drops against the duct wall as a consequence of centrifugal force, etc. The spiral duct arrangement extends down into the liquid and right down to the base of the separator so that there is the least possible speed and consequent drop formation when the fluid flow meets the liquid in the base of the separator. This may also be favorable with regard to separation in the base of the separator (all phases).

Gas which is separated out in the separator container 7 flows out through an outlet 6 on the top of the container 7, while the liquid phases and any solid elements flow out through an outlet 5 in the base of the container. It should be noted in particular in this connection that, although only one outlet 5 in the base of the container 7 is shown here, two or more outlets may be arranged in or above the base to allow separate phases of liquid to flow out. For example, in connection with the separation of oil/water, one outlet may be arranged in the bottom of the container for the water to flow out and one outlet may be arranged somewhat further up for the oil to flow out.

The volume taken up by the spiral arrangement can be reduced to a minimum by the use of a small material thickness. If the inlet is designed correctly, the forces which are to be taken up in the spiral arrangement will be small.

Possible solutions for separating liquid and solid phases in the base of the separator are not shown. Nor are details of the control system.

It is often important that there is the maximum possible free area for gas to flow out in the separator. This has been taken care of with the present solution. It will also be possible to arrange a solution for the promotion of drop coalescence at the gas outlet 6 (not shown in detail).

A position as shown in FIG. 3, with the spiral duct 2 arranged at a distance from the wall or thermally insulated from it, may be favorable in some cases where there are problems with exposure to a wall surface which has a different temperature to the flow. This may also be important if a corresponding arrangement is alos used for a system in which there are chemical reactions, for example an adiabatic reactor. A position away from the wall may also be expedient on the basis of factors associated with impact on the separator's wall material and its strength. For example, welding and stress concentrations.

If, on the other hand, heat exchange with the wall is desirable, the duct may be designed so that this is increased to the maximum. At a high rotational speed, the liquid phase will be pressed up against and on the outer side of the duct and it will be possible to achieve both a high speed, which is favorable for heat exchange, and a large contact surface, which is also favorable for heat exchange.

Figure 5:
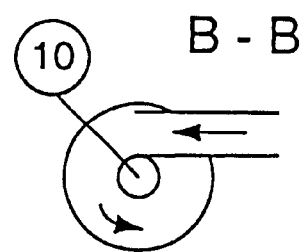
FIG. 5 shows a horizontal section along the line B—B in FIG. 4.
Figure 6:
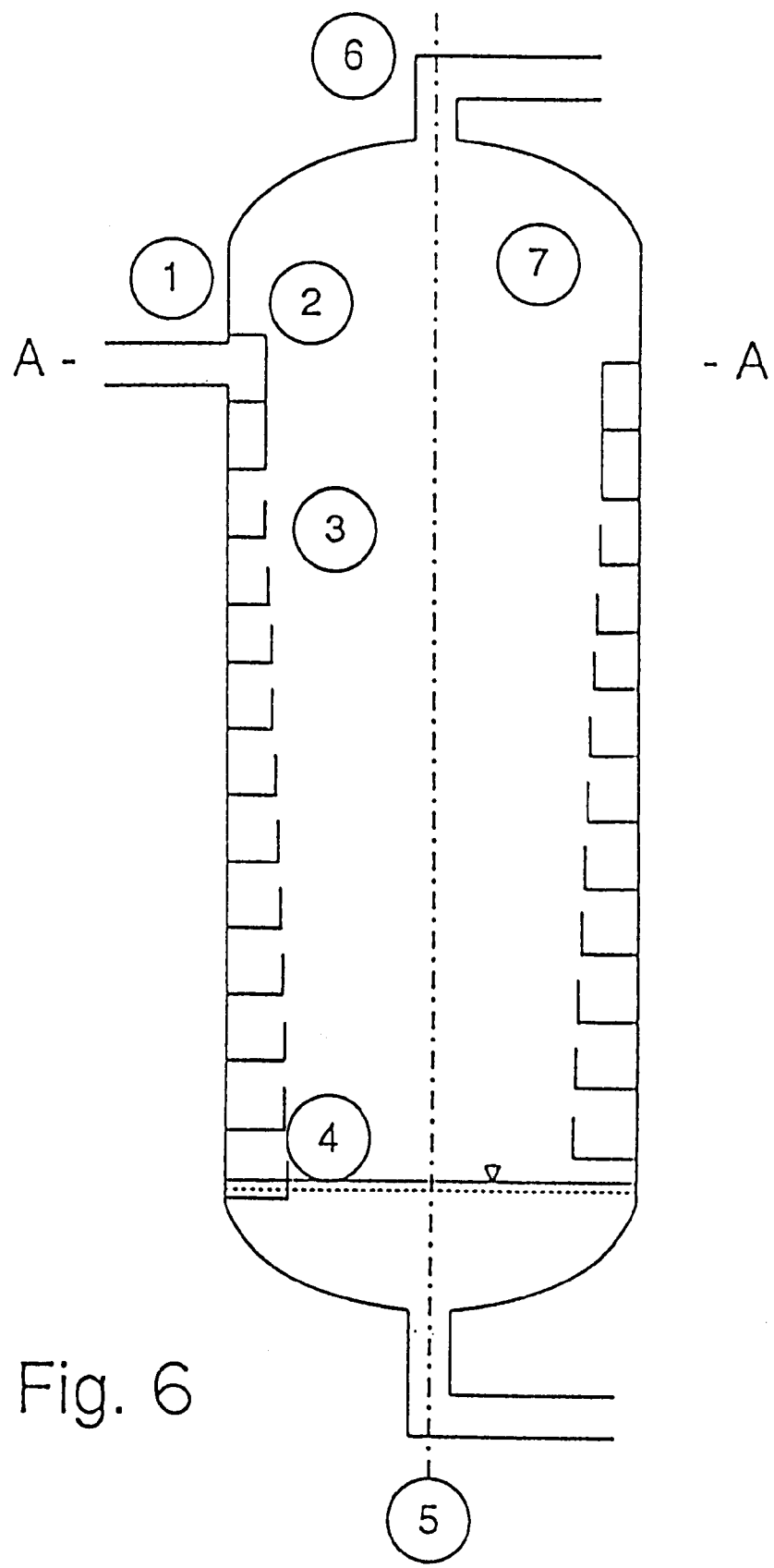
FIG. 6 shows another alternative embodiment of a separator having a modified spiral duct.

An alternative, in particular for sub-flows, will be as shown in FIGS. 4 and 5. Here the flow is led into a spiral duct arrangement 9, possibly arranged around a cylindrical bar or a similar structure, which is positioned in the center 10 of the spiral duct arrangement 9. The spiral duct arrangement is led down through the separator and down into the liquid in the base of the separator 11 in a manner equivalent to that described above. If a central tubular element is chosen, this may either be hollow so that it can be filled with liquid when there are large quantities of liquid in the separator or it may have a hot or cold medium flowing through it so that the flow in the spiral duct can be conditioned or treated with high or low temperatures.

What is claimed is:

1. A separating device for processing a fluid, said separating device comprising:

a container having a base, an inlet positioned in an upper portion of the container for the fluid to be separated, and at least two outlets for separated phases of the fluid; and a partially open spiral duct disposed in the container and extending from the inlet downward towards the base of the container, wherein the spiral duct is open over a substantial portion of its length so that gas can escape therefrom.

2. The separating device as claimed in claim 1, wherein the spiral duct is spaced from the inner peripheral surface of the container.

3. The separating device as claimed in claim 1, wherein the container is insulated externally.

4. The separating device as claimed in claim 1, further comprising a vertical structure disposed inside of the container, wherein the spiral duct is wound around the vertical structure.

5. The separating device as claimed in claim 1, wherein the vertical structure comprises a cylindrical bar.

6. The separating device as claimed in claim 1, further comprising a hollow tubular structure disposed in a vertical orientation inside of the container, wherein the spiral duct is wound around the hollow tubular structure.

7. The separating device as claimed in claim 1, wherein an upper section of the spiral duct is closed.

8. The separating device as claimed in claim 1, wherein the spiral duct increases in cross-section in the direction of flow.

9. The separating device as claimed in claim 1, wherein the container is generally cylindrical and has a vertical longitudinal axis, and the spiral duct is located in the container so as to extend along an inner peripheral surface of the container.

10. The separating device as claimed in claim 9, wherein the spiral duct is spaced from the inner peripheral surface of the container.

11. The separating device as claimed in claim 9, wherein the container is insulated externally.

12. The separating device as claimed in claim 9, further comprising a vertical structure disposed inside of the container, wherein the spiral duct is wound around the vertical structure.

13. The separating device as claimed in claim 9, wherein the vertical structure comprises a cylindrical bar.

14. The separating device as claimed in claim 9, further comprising a hollow tubular structure disposed in a vertical orientation inside of the container, wherein the spiral duct is wound around the hollow tubular structure.

15. The separating device as claimed in claim 9, wherein an upper section of the spiral duct is closed.

16. The separating device as claimed in claim 9, wherein the spiral duct increases in cross-section in the direction of flow.

17. A separating device for processing a fluid, said separating device comprising:

a cylindrical container having a base, an inlet positioned in an upper portion of the container for the fluid to be separated, a first outlet located in a top portion of the container for permitting gas to flow out of the container, and a second outlet located in a lowermost portion of the container for permitting solid materials to flow out of the container; and a partially open spiral duct disposed in the container and extending from the inlet downward towards the base of the container, wherein the spiral duct is open over a substantial portion of its length so that gas contained in the fluid can escape from the spiral duct.

* * * * *